US008446027B2

(12) United States Patent
Laz et al.

(10) Patent No.: US 8,446,027 B2
(45) Date of Patent: May 21, 2013

(54) TUNED ROLLING WAVE ENERGY EXTRACTOR

(71) Applicant: Huntington Ingalls, Inc., Newport News, VA (US)

(72) Inventors: William J. Laz, Virginia Beach, VA (US); Todd L. Sedler, Newport News, VA (US); Mohamed Belkhayat, Annandale, VA (US)

(73) Assignee: Huntington Ingalls, Inc., Newport News, VA (US)

( * ) Notice: Subject to any disclaimer, the term of this patent is extended or adjusted under 35 U.S.C. 154(b) by 0 days.

(21) Appl. No.: 13/709,150

(22) Filed: Dec. 10, 2012

(65) Prior Publication Data
US 2013/0093190 A1  Apr. 18, 2013

Related U.S. Application Data

(60) Continuation of application No. 13/493,385, filed on Jun. 11, 2012, now Pat. No. 8,330,286, which is a division of application No. 12/544,616, filed on Aug. 20, 2009, now Pat. No. 8,198,745.

(51) Int. Cl.
*F03B 13/10* (2006.01)
(52) U.S. Cl.
USPC ............................................. 290/42; 290/53
(58) Field of Classification Search
USPC ................... 290/42, 43, 44, 53, 54, 55
See application file for complete search history.

(56) References Cited

U.S. PATENT DOCUMENTS

| 4,266,143 | A  | * | 5/1981  | Ng ................................ | 290/53 |
| 4,340,821 | A  |   | 7/1982  | Slonim |  |
| 4,748,338 | A  | * | 5/1988  | Boyce ........................... | 290/42 |
| 5,783,893 | A  |   | 7/1998  | Dade et al. |  |
| 7,456,512 | B2 | * | 11/2008 | Nadel ............................ | 290/53 |
| 7,538,445 | B2 |   | 5/2009  | Kornbluh et al. |  |
| 7,649,276 | B2 | * | 1/2010  | Kornbluh et al. ............... | 290/53 |
| 7,737,569 | B2 | * | 6/2010  | Hench ............................ | 290/42 |
| 7,759,813 | B2 | * | 7/2010  | Fujisato ........................ | 290/53 |
| 7,834,474 | B2 |   | 11/2010 | Whittaker et al. |  |
| 7,964,984 | B2 | * | 6/2011  | Saavedra ....................... | 290/55 |
| 8,026,620 | B2 | * | 9/2011  | Hobdy ........................... | 290/42 |
| 8,046,108 | B2 |   | 10/2011 | Hench |  |
| 8,198,745 | B2 | * | 6/2012  | Laz et al. ....................... | 290/53 |

(Continued)

FOREIGN PATENT DOCUMENTS

GB  3691  0/1915
WO  WO 2006118482  11/2006

OTHER PUBLICATIONS

International Search Report and Written Opinion for corresponding International Application No. PCT/US2010/045695, mailed Jan. 13, 2011.

*Primary Examiner* — Nicholas Ponomarenko
(74) *Attorney, Agent, or Firm* — Hunton & Williams LLP

(57) ABSTRACT

An apparatus for extracting wave energy may include a watercraft, a pendulum and an energy converter. The watercraft may be configured to roll in response to wave action and may have roll characteristics that are tunable to characteristics of the wave action. The pendulum may be supported by the watercraft to enable the pendulum to swing in response to the wave action. An energy converter may be configured to convert the relative movement of the pendulum and watercraft into electrical energy. The pendulum may also be tunable to characteristics of the wave action.

20 Claims, 8 Drawing Sheets

U.S. PATENT DOCUMENTS

| | | |
|---|---|---|
| 8,219,257 B2 | 7/2012 | Hunt |
| 8,330,286 B2 * | 12/2012 | Laz et al. ............... 290/42 |
| 2008/0093858 A1 | 4/2008 | Hench |
| 2008/0265582 A1 | 10/2008 | Hench |
| 2009/0008942 A1 * | 1/2009 | Clement et al. ........... 290/53 |
| 2009/0127856 A1 | 5/2009 | Hench |
| 2009/0160191 A1 | 6/2009 | Beane |
| 2010/0230964 A1 * | 9/2010 | Sachs ..................... 290/42 |
| 2012/0063262 A1 | 3/2012 | Imran |
| 2012/0153627 A1 * | 6/2012 | Jo ........................ 290/53 |

* cited by examiner

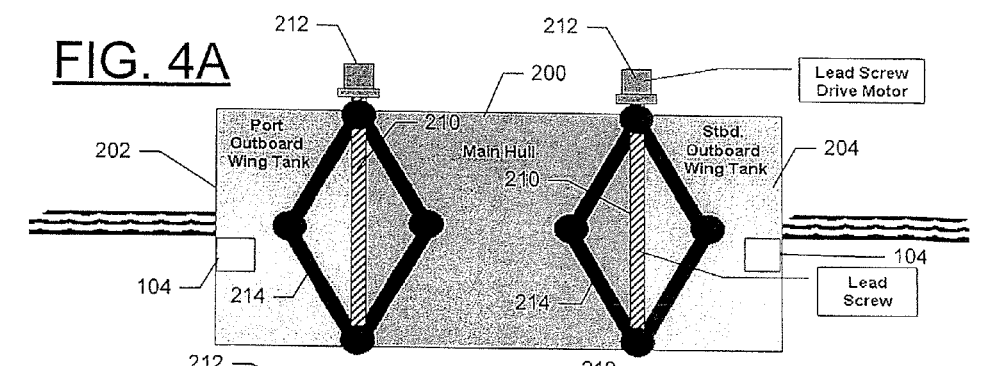
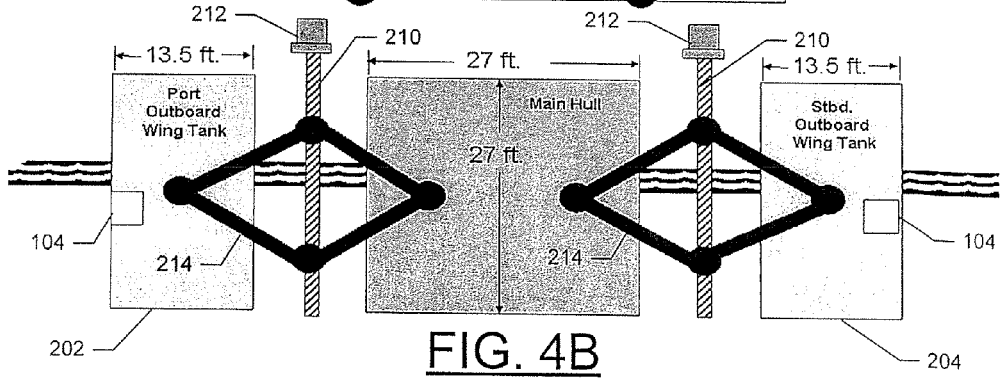

TUNED ROLLING WAVE ENERGY EXTRACTOR

CROSS-REFERENCE TO RELATED APPLICATIONS

This application is a continuation of U.S. application Ser. No. 13/493,385, filed Jun. 11, 2012, now U.S. Pat. No. 8,330,286, which is a division of U.S. application Ser. No. 12/544,616, filed Aug. 20, 2009, now U.S. Pat. No. 8,198,745.

FIELD OF THE INVENTION

Embodiments of the present invention relate generally to power generation technology, and more particularly, to providing a wave energy extractor for converting wave energy into electrical energy.

BACKGROUND OF THE INVENTION

Since the advent of electricity, technological developments have been continuously sought to harness natural resources for the production of electrical power. National economies and in many ways the entire global financial system now increasingly depend on the availability of abundant and low cost energy to fuel growth and maintain stability. Fossil fuels have long been a dominant source for the production of electrical power due to the relative abundance of fossil fuel resources and the low cost of such resources per unit of power produced. However, given the rapid growth of economies in developing nations and the ever increasing power demands of already developed nations, the demand for fossil fuels can often put pressure on the ability of suppliers to meet those demands. Furthermore, the concentration of certain resources in specific geographical regions that lack stability can create concerns regarding energy security. Thus, for example, there is a push within the United States to increase energy security by decreasing dependence on foreign energy production resources.

The prospect of climate change has also caused increasing pressure to reduce the dominance of fossil fuels, the burning of which releases green house gases that may contribute to global warming. Accordingly, alternative and often "green" sources of electrical power have been sought in recent years. Wind power and solar power projects are expanding rapidly to augment hydroelectric power production facilities that have been in service in relation to dams that have been built over the years. However, dams are not the only way to harness the power of water and convert such power into electrical energy. For example, some devices have been developed to harness the power of tides and waves. In relation to tide and wave based power production methods, as with other power production mechanisms, efficiency is often a concern.

Some examples of devices that may be used to harness wave power include an attenuator, point absorber, oscillating wave surge converter, an oscillating water column, an overtopping device and a submerged pressure differential device. The attenuator is typically a floating device that "rides" waves as they pass. The point absorber is also a floating device that absorbs wave energy while bobbing. However, both the attenuator and the point absorber utilize the mainly linear up and down motion of bobbing or wave riding as the mechanism for energy extraction and this ends up being inefficient as the motion of the particles in the wave itself is trochoidal. The oscillating wave surge converter has a tethered arm that moves in response to wave surges, while the submerged pressure differential device response to the pressure differential created by waves is to pump a fluid used to generate electricity. The oscillating water column device and the overtopping device use water turbines to create energy. Thus, none of the above listed wave energy extraction mechanisms may be able to take full advantage of the trochoidal nature of wave particle motion to improve energy efficiency.

Accordingly, it may be desirable to develop an improved wave energy extraction device.

BRIEF SUMMARY OF THE INVENTION

Embodiments of the present invention provide an apparatus for providing wave energy extraction that can take advantage of the trochoidal motion of wave particles by coupling to the rolling action of waves. Furthermore, some embodiments of the present invention may provide for a mechanism by which to tune energy extraction components to incoming waves. Thus, for example, energy of the wave may be more efficiently converted into electrical energy.

In one exemplary embodiment, an apparatus for extracting wave energy is provided. The apparatus may include a watercraft, a pendulum and an energy converter. The watercraft may be configured to enable rolling of the watercraft in response to wave action and may have roll characteristics that are tunable to characteristics of the wave action. The pendulum may be supported by the watercraft to enable the pendulum to swing in response to the wave action. The pendulum may be configured so that it's swing period is tuned to characteristics of the wave action. The energy converter may be configured to convert relative movement between the pendulum and the watercraft into electrical energy.

In another exemplary embodiment, a computer program product for extracting wave energy is provided. The computer program product includes at least one computer-readable storage medium having computer-executable program code portions stored therein. The computer-executable program code includes multiple executable program code instructions for receiving information defining characteristics of wave action proximate to a watercraft that is configured to roll in response to the wave action and that has a pendulum mounted thereat and configured to swing responsive to the wave action, and for tuning roll characteristics of the watercraft to the characteristics of the wave action.

In another exemplary embodiment, a system for providing wave energy extraction is provided. The system may include a tunable rolling wave energy extractor and a coupling apparatus. The tunable rolling wave energy extractor may include a watercraft configured to roll in response to wave action and having roll characteristics that are tunable to characteristics of the wave action, a tunable pendulum supported by the watercraft to enable the pendulum to be configured to swing in response to the wave action and have characteristics that are tunable to characteristics of the wave action, and an energy converter configured to convert relative movement between the pendulum and watercraft into electrical energy. The coupling apparatus may be configured to receive electrical energy from the energy converter and distribute the received electrical energy.

Embodiments of the invention may provide an ability to alter characteristics of the watercraft and the pendulum in order to improve wave energy extraction efficiency. In particular, embodiments of the present invention may provide a mechanism that improves energy extraction efficiency by enabling coupling of the energy extraction device to the incoming waves.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 5A:
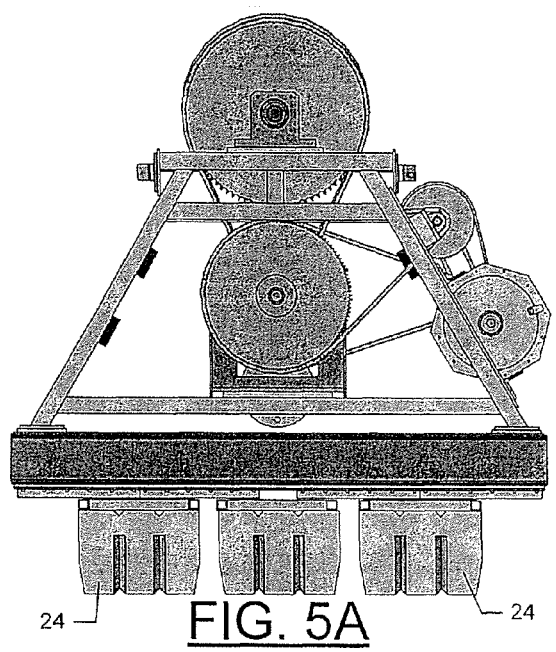
Figure 5B:
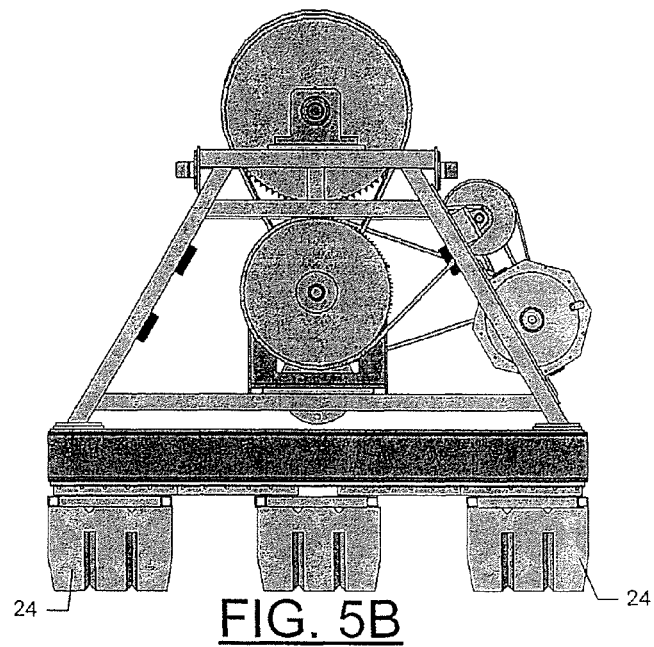
Figure 6A:
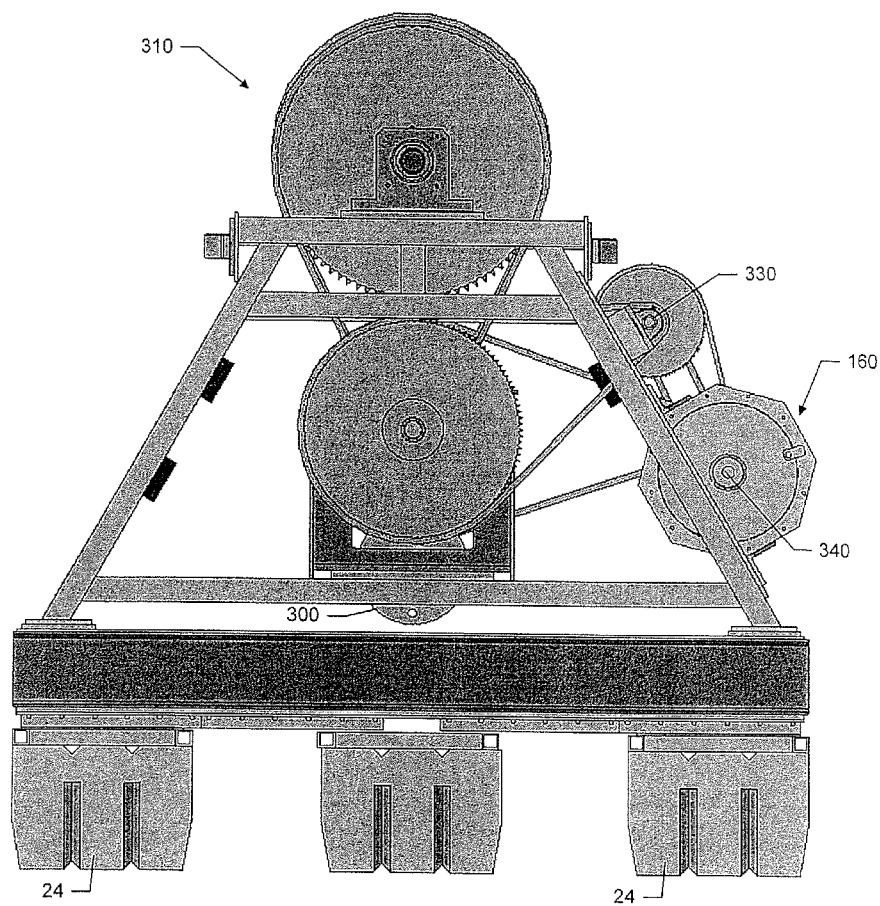
Figure 6B:
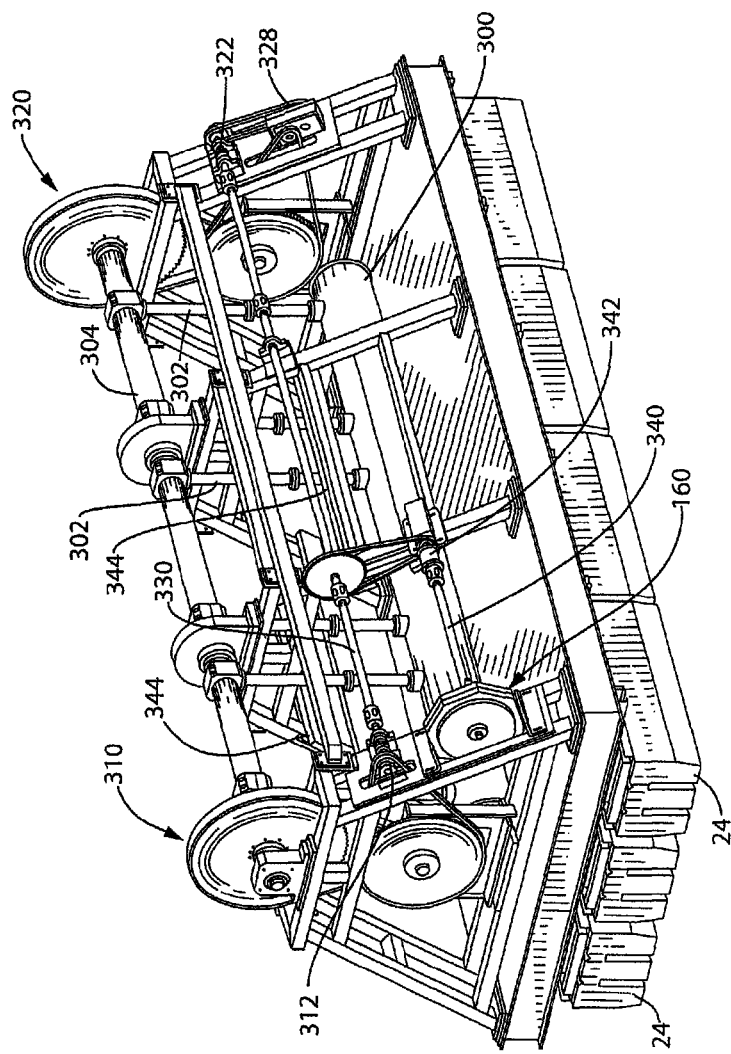
Figure 7:
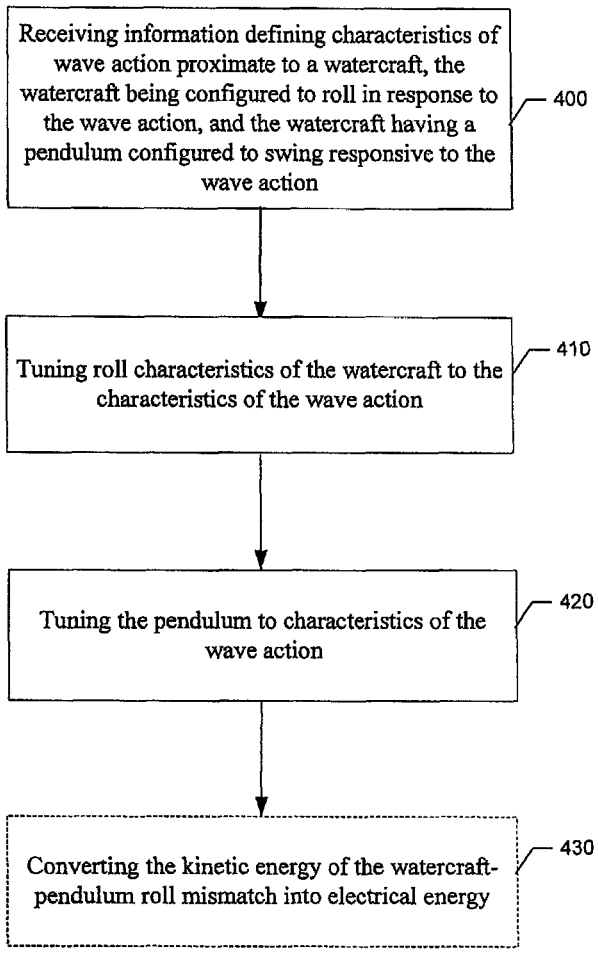

FIG. 4 (which includes FIGS. 4A and 4B) provides an illustration of one exemplary structure for providing a platform tuner in accordance with an exemplary embodiment of the present invention;

FIG. 5A illustrates wing tanks disposed in a retracted position where the wing tanks are positioned relatively close to the centerline of the watercraft according to an exemplary embodiment of the present invention;

FIG. 5B illustrates the wing tanks in an extended position where the wing tanks are relatively far from the centerline of the watercraft according to an exemplary embodiment of the present invention;

FIG. 6 (which includes FIGS. 6A and 6B) illustrates an example structural arrangement for a pendulum, drive system and alternator according to an exemplary embodiment of the present invention; and FIG. 7 is a flowchart of a method for extracting wave energy according to an exemplary embodiment of the present invention.

DETAILED DESCRIPTION OF THE INVENTION

Embodiments of the present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like reference numerals refer to like elements throughout.

Some embodiments of the present invention, as indicated above, provide wave energy extraction that can take advantage of the trochoidal motion of wave particles by coupling to the rolling action of waves in a tunable manner. In this regard, for example, embodiments of the present invention provide for a tunable rolling platform that has changeable physical characteristics, such as center of gravity and metacentric height, to enable knowledge of current wave conditions (e.g., wave amplitude and period) to be used to determine (or in some cases optimize) physical characteristics that are to be selected for improving the rolling characteristics of the platform (e.g., barge or ship). The rolling of the platform may work against an internal pendulum that may also be tuned (or tunable) in some cases. The platform and the pendulum may be tuned such that their natural roll and swing frequencies, respectively, are tuned or matched to the incoming wave frequency to provide improved (or maximum in some cases) angular rotations for both the platform and the pendulum. The platform and the pendulum roll out of phase from each other due to dampening added by energy extraction (e.g., via an alternator or generator). A drive system converts the opposing rolling motion of the platform and the pendulum into drive torque for the alternator. The initial mechanical energy extracted by the drive system is in the form of a sinusoidally varying torque. However, the drive system is configured to smooth the torque by using a high rotational inertia rotor on the alternator. The electricity generated may be conditioned and may then be either stored (e.g., in a battery or bank of batteries), used on the platform, or transmitted to a shore facility for distribution (e.g., on the national grid).

Figure 1:
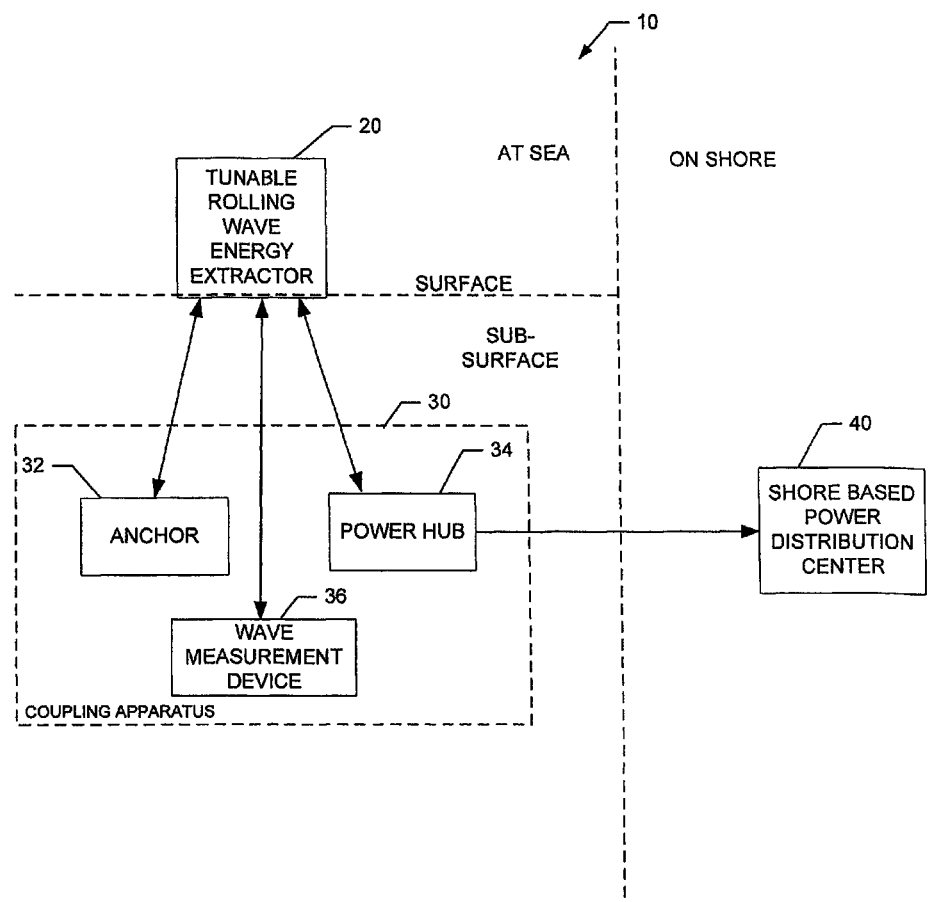
FIG. 1 is a block diagram illustrating an exemplary system for providing a tuned rolling wave energy extractor according to an exemplary embodiment of the present invention.

FIG. 1 is a basic block diagram illustrating a system 10 that may benefit from exemplary embodiments of the present invention. As shown and described herein, the system 10 includes some components that may be shore based and some components that may be sea based. In this regard for example, the system 10 may include a number of different devices or elements, each of which may comprise any device or means embodied in either hardware, software, or a combination of hardware and software configured to perform one or more functions, including those attributed to the respective devices or elements as described herein. For example, the system 10 may include a tunable rolling wave energy extractor 20, a coupling apparatus 30 (both of which are located at sea) and a shore based power distribution center 40.

The tunable rolling wave energy extractor 20, which will be described in greater detail below, may be configured to extract wave energy and convert such energy into electrical energy. The tunable rolling wave energy extractor 20 may be configured to provide the generated electrical energy to the coupling apparatus 30, which may then transfer the electrical energy to the shore based power distribution center 40, which may ultimately be connected to the electrical distribution grid. However, in some cases, the shore based power distribution center 40 may be a mobile distribution center.

In an exemplary embodiment, the coupling apparatus 30 may act as a mooring device for anchoring the tunable rolling wave energy extractor 20 to the sea bottom and may also transfer electrical energy to the shore based power distribution center 40. Accordingly, in some embodiments, the coupling apparatus 30 may include an anchor 32 to which the tunable rolling wave energy extractor 20 may be tethered by a chain, cable, or other attachment line. The attachment line, in many instances, should be arranged to be substantially longer than the depth of the water in which the attachment line is used. In some cases, a greater than 7:1 length to depth ratio may be employed. Although the tunable rolling wave energy extractor 20 may not be anchored to the sea floor in all cases, use of the anchor 32 may prevent or at least substantially reduce a recurring need to reset or reposition the tunable rolling wave energy extractor 20. The attachment line may hold the tunable rolling wave energy extractor 20 in a particular area in which the tunable rolling wave energy extractor 20 is set to enable the tunable rolling wave energy extractor 20 to one coupling apparatus 30 for transmission of the generated energy inland. The anchor 32 may be, for example, a concrete mooring or other suitable object attached to the sea floor to which the tunable rolling wave energy extractor 20 may be fixed.

In some embodiments, the coupling apparatus 30 may also include a power hub 34. The power hub 34 may, in some cases, serve as a collection point for one or more tunable rolling wave energy extractors in order to communicate wave generated electrical energy inland to the shore based power distribution center via a transmission line. The transmission line may, in some cases, be buried beneath the sea floor. As such, the power hub 34 may also be electrically connected to the tunable rolling wave energy extractor 20 via a transmission line. In some cases, the transmission line connecting the power hub 34 to the tunable rolling wave energy extractor 20 may actually also act as the attachment line.

In an exemplary embodiment, the coupling apparatus 30 may also include a wave measurement device 36. The wave measurement device 36 may be configured to measure wave characteristics and communicate information regarding the wave characteristics to the tunable rolling wave energy extractor 20. In an exemplary embodiment, the wave measurement device 36 may be embodied as a Doppler Velocity Log (DVL) configured to measure wave height and period, or an Acoustic Doppler Current Profiler (ADCP). In either case, the information regarding wave characteristics may be provided to the tunable rolling wave energy extractor 20 via the transmission line or another communication link between the coupling apparatus 30 and the tunable rolling wave energy extractor 20. The tunable rolling wave energy extractor 20 may then use the information regarding wave characteristics to tune itself to improve roll characteristics of the tunable rolling wave energy extractor 20 based on the current wave conditions.

Figure 2:
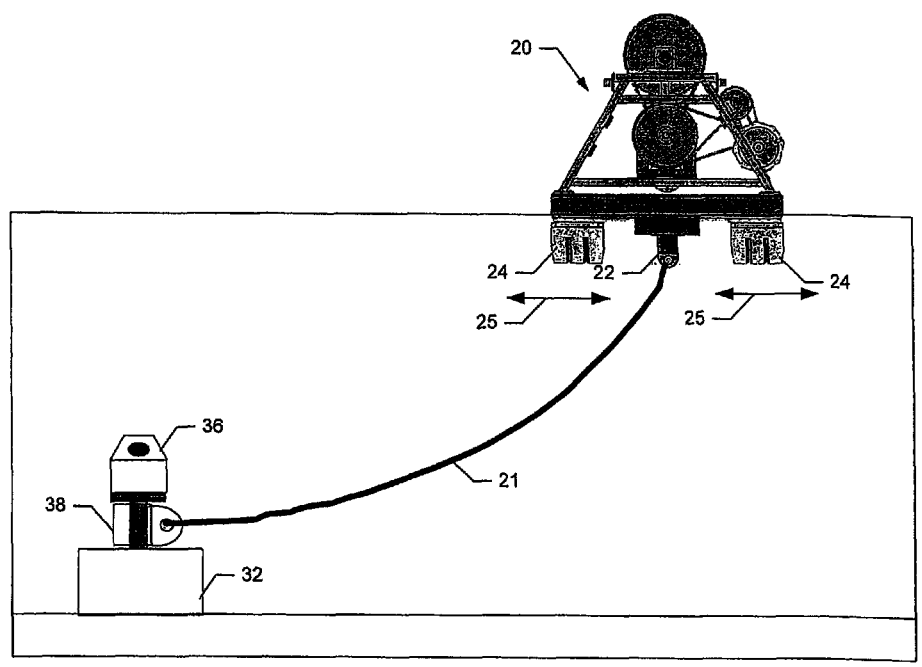
FIG. 2 shows a more detailed example of some portions of a system for extracting wave energy for conversion to electrical energy according to an exemplary embodiment of the present invention.

FIG. 2 shows a more detailed example of some portions of a system for extracting wave energy for conversion to electrical energy according to an exemplary embodiment. In this regard, as shown in FIG. 2, the anchor 32 is sitting on the sea floor with a rotating collar attachment 38 attached thereto. The rotating collar attachment 38 is mounted to a shaft that extends from the anchor 32 to enable 360 degree rotation of the rotating collar attachment 38. The attachment line (e.g., cable 21) extends from the rotating collar attachment 38 to an anchoring point 22 on the tunable rolling wave energy extractor 20. Thus, dependent upon the direction of the seas, the tunable rolling wave energy extractor 20 may be free to shift its position relative to the anchor 32 to present a beam-on aspect to waves that approach the tunable rolling wave energy extractor 20. By enabling the tunable rolling wave energy extractor 20 to take the waves beam-on, a greater roll can be experienced on the tunable rolling wave energy extractor 20 for each respective wave.

The wave measurement device 36 of FIG. 2 is a DVL. The DVL may communicate information regarding wave characteristics to the tunable rolling wave energy extractor 20 via the cable 21. However, a separate communication line (not shown) may be used in some cases. The information regarding wave characteristics may be provided to a data acquisition unit on the tunable rolling wave energy extractor 20. However, in some cases, the data acquisition unit may be configured to determine wave characteristics without input from a remote device such as the wave measurement device 36 attached to the coupling apparatus 30. In any case, based on the information regarding wave characteristics, an onboard tuning controller on the tunable rolling wave energy extractor 20 may utilize the wave characteristic information to tune the tunable rolling wave energy extractor 20 to the incoming waves.

Figure 3:
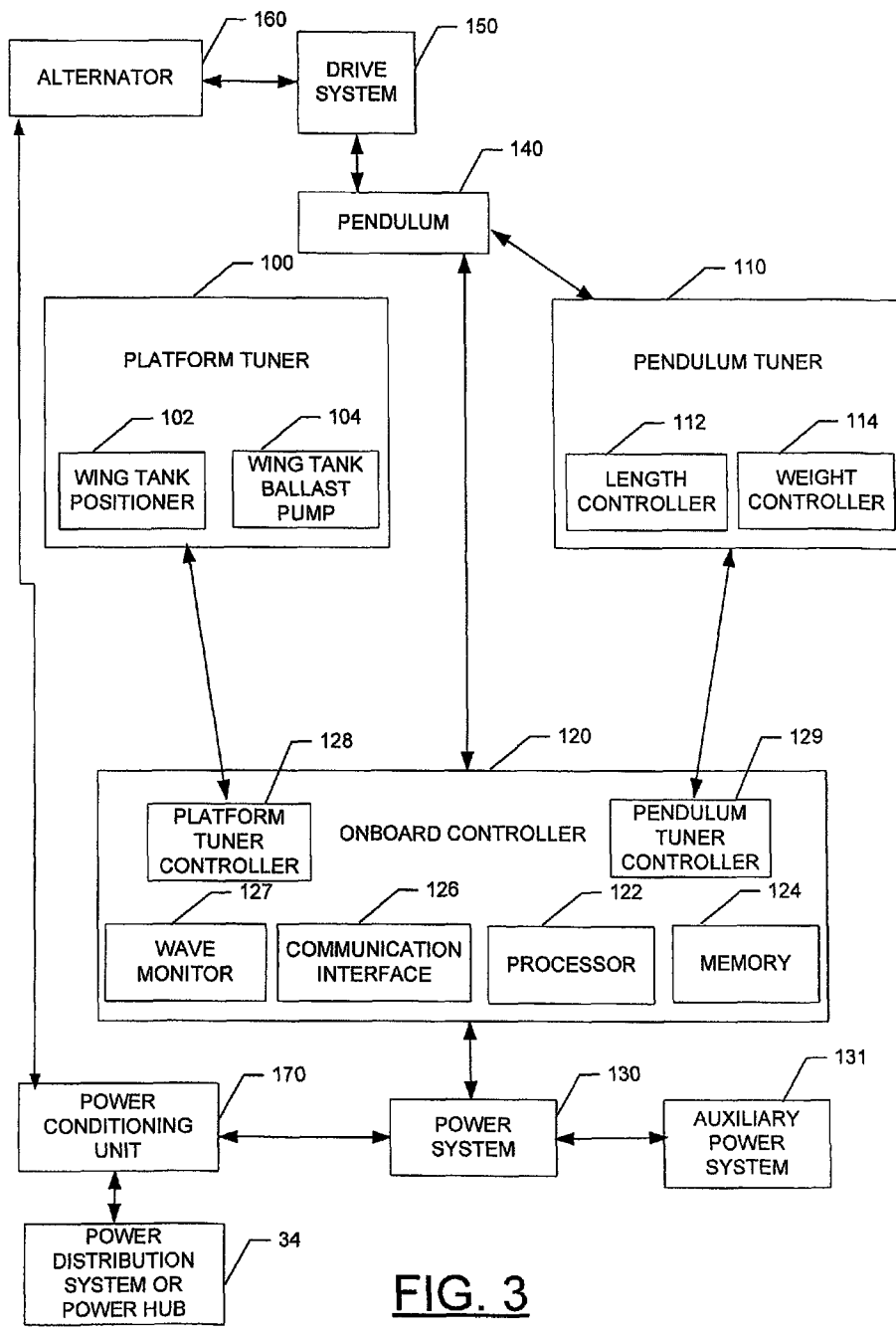
FIG. 3 illustrates a block diagram of the tunable rolling wave energy extractor according to an exemplary embodiment.

FIG. 3 illustrates a block diagram of the tunable rolling wave energy extractor 20 according to an exemplary embodiment. As such, while FIG. 3 illustrates one possible functional arrangement for embodying the tunable rolling wave energy extractor 20, alternative arrangements are also possible with either more or less components than those shown in the example of FIG. 3. The tunable rolling wave energy extractor 20 according to one example embodiment may include a watercraft forming a floating platform with tunable characteristics for controlling wave roll response of the watercraft. The watercraft may also include a pendulum positioned to enable the pendulum to swing responsive to movement of the watercraft. The watercraft may also house or support the components shown in the block diagram of FIG. 3 that may be used for extraction of wave energy and conversion of wave energy to electrical energy.

As shown in FIG. 3, the tunable rolling wave energy extractor 20 may include a platform tuner 100 including components configurable to tune the watercraft for improved rolling characteristics responsive to waves the watercraft encounters. In an exemplary embodiment, the platform tuner 100 may include configurable floatation tanks such as wing tanks or pontoons (e.g., see wing tanks 24 on FIG. 2) that may be extended away from a centerline of the watercraft or contracted toward the centerline of the watercraft (e.g., see arrows 25 in FIG. 2) to alter roll characteristics of the watercraft. Thus, for example, the platform tuner 100 may include a wing tank positioner 102, an example of which is shown in FIG. 4 below. The wing tank positioner 102 may be configured to move the configurable wing tanks 24 (or pontoons) inward or outward in order to decrease or increase, respectively, the height of the metacenter of the rotating watercraft. In other words, generally speaking, in some examples, as the wing tanks 24 are moved outward, the metacentric height of the watercraft is raised and as the wing tanks 24 are moved inward, the metacentric height of the watercraft is lowered. The metacentric height is the mathematical location in space about which the watercraft rolls in response to wave action.

The platform tuner 100 may in some cases also include one or more ballast pumps (e.g., wing tank ballast pump 104) configured to either pump water to or from the wing tanks 24 to add ballast to (e.g., in response to pumping water into the wing tanks 24) or remove ballast from (e.g., in response to pumping water from the wing tanks 24) the wing tanks 24 in order to change the center of gravity of the watercraft based on the amount of water in the wing tanks 24. As a possible alternative to the ballast pumps, the wing tank ballast pump 104 may be replaced by a blower and the wing tanks 24 may include always open louvers in bottoms of the wing tanks 24 and vents in the top of the wing tanks to permit control over the amount of water in the wing tanks 24 by virtue of the position of the vents and the blowing of air into the wing tanks 24. For example, when the vents are shut, any air in the wing tanks 24 may displace a corresponding amount of water in order to maintain a particular center of gravity for the watercraft. However, if the vents are kept shut and the blower blows air into the wing tanks 24, the air may displace water out the louvers and the center of gravity may be changed as the watercraft rides higher in the water. Meanwhile, if the vents are opened, air may be allowed to leave through the vents and be displaced by water to alter the center of gravity as the watercraft rides lower in the water. Other mechanisms for altering the center of gravity may also be employed.

Modification of the metacentric height and the center of gravity enables the roll characteristics of the watercraft to be tuned to maximize or at least increase rolling action of the watercraft in response to wave action. In this regard, the distance between the watercraft's metacenter and the watercraft's center of gravity (referred to as GM) directly impacts the roll characteristics of the watercraft. However, alteration of the metacentric height of the watercraft may, in some cases, have a dominant effect on roll characteristics of the watercraft. Accordingly, in some embodiments, the wing tanks 24 may simply be filled with air continuously or may be filled with another buoyant substance that does not permit alteration of the buoyancy of the wing tanks 24. In such embodiments, tuning of the watercraft's roll characteristics may be primarily accomplished via the shifting of the position of the wing tanks 24 inward or outward.

In some embodiments, the tunable rolling wave energy extractor 20 may further include a pendulum tuner 110 configured to alter swing properties of the pendulum in order to increase angular rotation of the pendulum responsive to wave action. As such, in embodiments where the pendulum tuner 110 is employed, swing properties of the pendulum may be altered to improve the output of the tunable rolling wave energy extractor 20. However, in some embodiments, the pendulum tuner 110 may be omitted and any tuning of the pendulum may be made manually either based on theoretical expectations or based on adjustments made after monitoring energy output of the tunable rolling wave energy extractor 20 relative to the waves encountered by the tunable rolling wave energy extractor 20.

When employed, the pendulum tuner 110 may include one or both of a length controller 112 and a weight controller 114. The length controller 112 may include, for example, a lead screw and a lead screw drive motor that is powered electrically and is configured to turn the lead screw. As the lead screw turns in one direction, a telescoping swing arm (or anus) connecting a pivot point of the pendulum to a bob of the pendulum may be extended in length. Meanwhile, as the lead screw turns in the opposite direction, the telescoping swing arm may contract in length. The weight controller 114 may add weight to or subtract weight from the pendulum bob. In one example, since the watercraft operates at sea, water may be pumped to or from the bob via a channel within the telescoping arm (or arms) in order to alter the weight of the pendulum bob. Period of the pendulum is directly related to the length of the swing arm and the weight of the pendulum bob determines the amount of torque ultimately provided to an alternator or generator that converts the mechanical energy of the pendulum into electrical energy. Thus, by controlling length, swing frequency may be tuned and by controlling weight, the torque output may be controlled.

Operation of the platform tuner 100 and the pendulum tuner 110 may be controlled by an onboard controller 120. The onboard controller 120 may include electrical hardware for controlling various functions of the tunable rolling wave energy extractor 20. In some cases, the hardware may include a processor 122 and memory 124. The memory 124 may include, for example, one or more volatile and/or non-volatile memories. As such, for example, the memory 124 may be a hard drive or other electronic storage device comprising gates configured to store data (e.g., bits) that may be retrievable by a machine (e.g., a computing device such as the processor 122). The memory 124 may be configured to store information, data, applications, algorithms, instructions or the like for enabling the processor 122 or other components to carry out various functions in accordance with exemplary embodiments of the present invention. Thus, for example, the memory 124 could be configured to store instructions for execution by the processor 122.

The processor 122 may be embodied in a number of different ways. For example, the processor 122 may be embodied as one or more of various processing means such as a coprocessor, a microprocessor, a controller, a central processing unit (CPU), or various other processing devices including integrated circuits such as, for example, an ASIC (application specific integrated circuit), an FPGA (field programmable gate array), a hardware accelerator, a special-purpose computer chip, or the like. As such, the processor 122 may be configured to execute instructions stored in the memory 124 or execute hard coded functionality. The processor 122 may include, among other things, a clock, an arithmetic logic unit (ALU) and logic gates configured to support operation of the processor 122.

The processor 122 may be embodied as, include or otherwise control a communication interface 126. The communication interface 126 may be any means such as a device or circuitry embodied in either hardware, software, or a combination of hardware and software that is configured to receive and/or transmit data from/to a network and/or any other device or module in communication with the onboard controller. In this regard, for example, the communication interface 126 may include, for example, an antenna (or multiple antennas) and supporting hardware and/or software for enabling communications with a wireless communication network. In some environments, the communication interface 126 may alternatively or also support wired communication such as internal communication of components on the watercraft.

In an exemplary embodiment, the processor 122 may be embodied as, include or otherwise control a wave monitor 127, a platform tuner controller 128 and/or a pendulum tuner controller 129. The wave monitor 127, the platform tuner controller 128 and the pendulum tuner controller 129 may each be any device or means embodied in either hardware, software, or a combination of hardware and software that is configured to perform the corresponding functions of the wave monitor 127, the platform tuner controller 128 and the pendulum tuner controller 129, respectively, as described herein.

The wave monitor 127 may be configured to determine wave characteristics based on the rolling of the watercraft. In some cases, the wave monitor 127 may be configured to determine wave characteristics itself (e.g., using gimbals or other components). However, in some embodiments, the wave monitor 127 may receive information from the wave measurement device 36 to determine wave characteristics based on the received information. Information from the wave monitor 127 may be provided to the processor 122 to enable the processor 122 to control (or provide information to enable control of) characteristics of the watercraft and/or pendulum to improve the efficiency of energy extraction from the incoming waves.

In some embodiments, the wave monitor 127 may also include other onboard monitoring equipment that may be controlled by the processor 122. For example, oil pressure and oil flow may be monitored for lubricating oil systems for various gear and other drive system components. Torque limiter input and output may be monitored to enable monitoring of differential slip. Other items that may be monitored may include pendulum angle, wing tank position, load parameters, and others. In some cases, the wave monitor 127 may provide monitored data to the processor 122 for use in connection with control over various pumps, motors and other devices onboard the tunable rolling wave energy extractor 20. However, in other cases, the wave monitor 127 may provide information on tunable rolling wave energy extractor 20 operation to a shore based facility via the communication interface 126 via a wired or wireless communication link. For example, the wave monitor 127 may provide information regarding current location (e.g., via global positioning system (GPS) coordinates) of the watercraft, current wave characteristics and current energy output. A shore based facility may then provide direction (e.g., via the wireless link or via manual changes to the algorithm or tunable characteristics of the watercraft) to alter the watercrafts loading or otherwise alter the tuning of the watercraft in order to alter operation of the watercraft.

In an exemplary embodiment, the platform tuner controller 128 may be configured to provide control signals to the platform tuner 100 to direct the platform tuner 100 to adjust center of gravity and/or metacentric height of the watercraft (e.g., by adjusting a position of the wing tanks 24 and/or adjusting an amount of water in the wing tanks 24). In an exemplary embodiment, the memory 124 may store instructions associated with an algorithm for tuning watercraft characteristics (e.g., center of gravity and/or metacentric height) to incoming wave characteristics (e.g., wave amplitude and period) and the algorithm may be executed by the processor 122 to determine the watercraft characteristics. After determining watercraft characteristics for the incoming wave characteristics, the processor 122 may provide information to the platform tuner controller 128, which may control characteristics of the watercraft accordingly via the platform tuner 100.

In an exemplary embodiment, the algorithm may include various models, each of which may model a corresponding characteristic of the tunable rolling wave energy extractor 20. For example, the algorithm may include a wave model, a pendulum response model, a watercraft response model, a load control model, and gear train and alternator models in addition to being able to access environmental data. The algorithm may utilize the various models to determine tuner and/or pendulum control parameters to optimize or otherwise improve watercraft roll and/or pendulum swing characteristics along with load parameters.

Similarly, if an automatically tunable pendulum is in use, the pendulum tuner controller 129 may be configured to provide control signals to the pendulum tuner 110 to direct the pendulum tuner 110 to adjust swing characteristics of the pendulum (e.g., by adjusting a length of the swing arm and/or weight of the pendulum bob). In an exemplary embodiment, the memory 124 may store instructions associated with an algorithm for tuning pendulum characteristics (e.g., length of the swing arm and/or weight of the pendulum bob) to incoming wave characteristics (e.g., wave amplitude and period) and the algorithm may be executed by the processor 122 to determine the pendulum characteristics. After determining pendulum characteristics for the incoming wave characteristics, the processor 122 may provide information to the pendulum tuner controller 129, which may control characteristics of the pendulum accordingly via the pendulum tuner 110. However, in embodiments where the pendulum is not automatically tunable, the above described algorithm may be used to determine an optimal or otherwise good set of pendulum characteristics based on theoretical or expected wave characteristics (e.g., averaged data) and the pendulum characteristics may be manually adjusted. In accordance with some embodiments of the present invention, the manual adjustment of pendulum characteristics may be accomplished prior to initial placement of the energy extractor into service or periodically. Thus, for example, if average wave characteristics are distinctly different monthly or seasonally, the pendulum could be manually tuned for each change of month or season.

In an exemplary embodiment, the onboard controller 120 may be powered by a power system 130 of the watercraft. The power system 130 may powered by the conditioned output of the alternator 160 (e.g., via a power conditioning unit 170) or a marine battery, or any other suitable battery or bank of batteries configured to power the onboard controller and other powered components of the watercraft. One or more batteries may also form the auxiliary power system 131, which may be configured to provide backup power for the watercraft. In some embodiments, the power system 130 may further power electrical motors, pumps, monitoring equipment, communication equipment and/or other electrical components on the watercraft. As such, the power system 130 may include a direct current (DC) power source such as a battery (or battery bank) and may also include a motor generator or other component for converting DC power into alternating current (AC) power (or vice versa) to power some components. The conditional power output from the alternator 160 may keep the power system 130 and/or the auxiliary power system 131 charged (e.g., via the power conditioning unit 170) for use during periods of little or no wave activity.

As discussed above, the watercraft may be equipped with a tunable pendulum 140. In an exemplary embodiment, the pendulum 140 may be placed on the watercraft such that the pendulum is enabled to pivot in a direction substantially perpendicular to the centerline or keel of the watercraft. Responsive to wave motion, and based also on the motion of the watercraft, the pendulum 140 may swing back and forth to provide a torque to a drive system 150. The drive system 150 may be configured to utilize a system of gears and clutches in order to convert the movement of the pendulum into movement of a shaft that may be used to produce electricity via a generator or alternator 160. In some embodiments, the power system 130 and/or the auxiliary power system 131 may be rechargeable and may be recharged by electricity produced by the alternator 160 (e.g., via the power conditioning unit 170). As such, the electrical energy produced by the alternator 160 may be used to power the watercraft, stored (e.g., in the battery or bank of batteries), or may be transmitted off of the watercraft (e.g., to the power hub 34).

The block diagrams of FIGS. 1 and 3 have been provided to illustrate the basic functional relationships between various components of an exemplary embodiment of the present invention. However, different structures and different arrangements may be used to implement several of the functional components illustrated in FIGS. 1 and 3. Some examples of arrangements or components are illustrated in FIG. 2. FIGS. 4-6 provide additional examples of specific structures or arrangements that may be used for certain components in some exemplary embodiments. However, it should be appreciated that the structures and arrangements illustrated in FIGS. 4-6 are provided by way of example and not of limitation.

FIG. 4 (which includes FIGS. 4A and 4B) provides an illustration of one exemplary structure for providing a platform tuner 100 in accordance with an exemplary embodiment. In this regard, as shown in FIG. 4, the watercraft may include a main hull 200 and wing tanks (e.g., wing tanks 24) that may include a port wing tank 202 and a starboard wing tank 204. In one example, the main hull 200 may have a width of about 27 feet at the beam and each wing tank may have a width of about 13.5 feet. However, larger or smaller watercraft may be employed in some embodiments. In this example, the wing tank positioner 102 according to one example embodiment may include a lead screw 210 and a lead screw drive motor 212 for each wing tank. Thus, for example, power may be applied to the lead screw drive motor 212 from the power system 130 and the lead screw drive motor 212 may turn in a direction dictated by the power applied. In this regard, movement of the lead screw drive motor 212 in one direction may cause a first direction of rotation of the lead screw 210 and movement of the lead screw drive motor 212 in an opposite direction may cause a second direction of rotation of the lead screw 210. Extendible linkages 214 may ride on the lead screw 210 and may be threaded to ride away from each other in response to movement of the lead screw 210 in the first direction and toward each other in response to movement of the lead screw 210 in the second direction. As the extendible linkages 214 ride away from each other, the port wing tank 202 and the starboard wing tank 204 may be drawn in toward the main hull 200 as shown in FIG. 4A. Meanwhile, as the extendible linkages 214 ride toward each other, the port wing tank 202 and the starboard wing tank 204 may be extended away from the main hull 200 as shown in FIG. 4B.

In some embodiments, rather than extending off the side of the watercraft, the wing tanks 24 may be positioned underneath the watercraft as shown in FIG. 5, which includes FIGS. 5A and 5B. FIG. 5A illustrates the wing tanks 24 in a retracted position where the wing tanks 24 are positioned relatively close to the centerline of the watercraft. Meanwhile, FIG. 5B illustrates the wing tanks 24 in an extended position where the wing tanks 24 are relatively far from the centerline of the watercraft.

By altering the position of the wing tanks, the watercraft's waterplane inertia may be modified. By altering the weight of the wing tanks, the watercraft's center of gravity may be modified. The distance between the watercraft's metacenter and the watercraft's center of gravity (e.g., GM) directly impacts the roll characteristics of the watercraft. Thus, the combined impact of altering the watercraft's waterplane inertia and the watercraft's center of gravity, changes may be made to the watercraft's natural roll frequency. In particular, the natural roll frequency of the watercraft may be tuned to the incoming wave frequency to maximize or otherwise improve angular rotation of the watercraft and the pendulum as indicated above. Thus, in some embodiments, weight of the wing tanks may be selectably controlled. As such, FIG. 4 also shows wing tank ballast pumps 104 associated with each of the port wing tank 202 and the starboard wing tank 204 for pumping water into or out of each wing tank to alter the center of gravity of the watercraft. In some cases, the wing tank ballast pumps 104 (or even a single pump serving both tanks) may located apart from the wing tanks themselves (e.g., in the main hull 200). As indicated above, however, the wing tanks may simply be pontoons in some embodiments and therefore, there may not be any pumps employed in some cases.

As also discussed above, the tunable rolling wave energy extractor 20 according to various example embodiments may include a watercraft forming a floating platform with tunable characteristics for controlling wave roll response of the watercraft. The watercraft may also support the pendulum 140 that swings responsive to movement of the watercraft to extract energy from waves. The pendulum 140 may employ a variable length of the swing arms holding the pendulum 140 and/or may employ a variable weight for the pendulum bob 300. By varying the weight of the pendulum bob 300, the torque delivered to the drive system (and ultimately to the alternator 160) may be varied. The drive system 150 is the mechanism by which the rolling action of the waves is converted into mechanical motion of a shaft and the alternator 160 is the mechanism by which the rotation of the shaft is converted into electrical energy. Power conditioner 170 senses the load power factor and changes characteristics of the alternator 160 for optimum power production.

FIG. 6 (which includes FIGS. 6A and 6B) illustrates one structural arrangement for the pendulum (e.g., items 300 and 302), the drive system (e.g., items 304, 310, 312, 330, 320, 322, 328, 340, 342) and the alternator 160 according to an exemplary embodiment. It should be noted, however, that FIG. 6 merely illustrates one example structural arrangement and others are also possible. Furthermore, it should be noted that FIG. 6 illustrates components situated on top of the watercraft, which is supported by the wing tanks 24, but the components are not necessarily to scale and not all components are necessarily shown. For example, in one embodiment, the components of the pendulum (e.g., items 300 and 302), the drive system (e.g., items 304, 310, 312, 330, 320, 322, 328, 340, 342), and the alternator 160 that are shown in FIG. 6 may be enclosed within one or more housing structures such as the hull or superstructure of the watercraft. As such, the housing that surrounds the components of the pendulum (e.g., items 300 and 302), the drive system (e.g., items 304, 310, 312, 330, 320, 322, 328, 340, 342), and the alternator 160 may prevent seawater or other corrosive elements from reaching the components. Many wave energy extraction mechanisms that are currently in use expose working parts to seawater, and therefore require more routine maintenance. By protecting working components from exposure to seawater, the frequency and extent of maintenance may often be reduced by embodiments of the present invention.

As shown in FIG. 6, the pendulum may include a bob 300 and swing arms 302 that extend from a pendulum drive shaft 304 that forms the pivot point of the pendulum. As the bob 300 swings first one way and then the other, the pendulum drive shaft 304 rotates in opposite directions and provides a sinusoidally varying torque. The torque may be rectified, for example, by employing a one-way slip clutch at each end of the pendulum drive shaft 304. Thus, for example, when the bob 300 swings in one direction a corresponding one-way slip clutch 312 applies torque to a first gear set 310 disposed at one end of the watercraft while the other one-way slip clutch 322 slips. Then, when the bob 300 swings in the other direction, the other one-way slip clutch 322 applies torque to a second gear set 320 disposed at the opposite end of the watercraft from the first gear set 310 and the one-way slip clutch 312 associated with the first gear set 310 slips. The first and second gear sets 310 and 320 may each include a plurality of gears, chains, intermediate shafts, and flexible couplings (e.g., to account for thermal expansion and design tolerances) configured to change the speed of shaft rotation and one of the first and second gear sets 310 or 320 may include a reversing gear 328 to provide that both gear sets induce rotation in the same direction for a common intermediate drive shaft 330. In this regard, for example, while the pendulum drive shaft 304 rotates back and forth at something on the order of 3 revolutions per minute (rpm), the first and second gear sets 310 and 320 may provide torque in the same direction to provide approximately 1200 rpm at the common intermediate drive shaft 330.

The torque provided to the common intermediate drive shaft 330 may have a constant rotational direction, but may be pulsed in amplitude. The common intermediate drive shaft 330 may then be coupled to an alternator shaft 340 that provides mechanical power to the alternator 160 for the production of electrical power. In an exemplary embodiment, the alternator shaft 340 may be a high rotational inertia rotor to smooth out the torque pulses provided by the common intermediate drive shaft 330. A torque limiter 342 may also be applied to the alternator shaft 340. Moreover, in some examples, one or more bumpers 344 may be provided in the support framework of the watercraft in order to limit the movement range of the pendulum. The bumpers 344 may be made of wood, plastic, rubber or another non-metallic material.

In one specific and non-limiting embodiment, the pendulum drive shaft 304 may have two (double strand) steel sprockets with 84 teeth (100 pitch) that are approximately 34.16" in diameter at each end for a total of four sprockets. A first stage of 7:1 reduction may be provided when the sprockets at one end of the pendulum drive shaft 304 turn and through their respective drive chains spin a set of double strand sprockets with 12 teeth (100 pitch) that are about 5.42" in diameter on a first intermediate shaft. The first stage of reduction may, for example, change a maximum value of 2,144 ft. lbs at 3.28 rpm to a torque of 255 ft. lbs at an increased rpm of 23 on the first intermediate shaft. An additional sprocket may be provided on the first intermediate shaft as a single strand sprocket with 112 teeth (60 pitch) that is about 27.18" in diameter. A second stage of reduction may occur when the sprocket on the first intermediate shaft drives a 16 tooth (60 pitch) sprocket (about 4.22" in diameter) on a second intermediate shaft corresponding to the common intermediate drive shaft 330. This second stage of reduction may reduce torque to about 35 ft. lbs. and increase rpm on the second intermediate shaft to about 161. Another sprocket may be provided on the second intermediate shaft that is a single strand sprocket with 112 teeth, (35 pitch) and about 13.6" in diameter. A third stage of reduction may occur when this sprocket drives the alternator drive shaft 340 through a 15 tooth sprocket, about 2" in diameter. The third stage of reduction may change the torque to about 4.4 ft. lbs and the rpm to about 1200, which is equivalent to 1 mechanical horsepower. FIG. 6 shows an example as described above.

In one example, the alternator 160 may be a permanent magnet alternator such as the one described in U.S. Pat. No. 5,783,893. However, the exact sizes and designs of the gear sets and alternator may be altered in accordance with the design requirements of each particular implementation.

During operation, the extracted energy may act as a dampening force on both the pendulum 140 and on the rolling of the watercraft and tend to move both devices off resonance. Accordingly, the processor 122 may actively control the platform tuner controller 128 and/or the pendulum tuner controller 129 to make adjustments to improve the output of the tunable rolling wave energy extractor 20. In an exemplary embodiment, the processor 122 may be further configured to control power take off (e.g., dampening), for example, by including or otherwise controlling a load controller. Thus, for example, roll characteristics may also be controlled based on electrical loading. Although the tunable rolling wave energy extractor 20 is typically tuned to increase rolling during normal operation, during heavy weather or other conditions during which it may be desirable to reduce rolling of the watercraft, the processor 122 may utilize load control as well as control over the pendulum 140 and the wing tanks 24 to help reduce rolling of the watercraft. However, other techniques for dealing with heavy weather may also be implemented.

In this regard, for example, during heavy weather it may be desirable to tow the tunable rolling wave energy extractor 20 into quieter waters. As such, the tunable rolling wave energy extractor 20 may be detachable from the anchor 32 to enable towing. When towing or mere reduction of rolling of the watercraft is not desired or not practical, some embodiments may permit temporary sinking or partial sinking of the tunable rolling wave energy extractor 20. In this regard, for example, the tunable rolling wave energy extractor 20 may be provided with an ability to completely fill the wing tanks 24 and perhaps also other void spaces of the watercraft in order to sink or partially sink the watercraft to reduce the effect of heavy seas on the tunable rolling wave energy extractor 20. After the heavy seas have subsided, wing tank ballast pump 104 may be powered from a watercraft auxiliary power system 131 or salvage air may be provided to the wing tanks 24 and/or other void spaces to force the sea water out of such spaces to re-float the watercraft. The salvage air may be provided from a remote vessel to be connected by divers or, in some cases, from compressed air tanks on the watercraft that may be operated to provide air into the wing tanks 24 and/or other void spaces.

FIG. 7 is a flowchart of a system, method and program product according to an exemplary embodiment of the invention. It will be understood that each block or step of the flowchart, and combinations of blocks in the flowchart, can be implemented by various means, such as hardware, firmware, and/or software including one or more computer program instructions. For example, one or more of the procedures described above may be embodied by computer program instructions. In this regard, the computer program instructions which embody the procedures described above may be stored by a memory device and executed by a processor. As will be appreciated, any such computer program instructions may be loaded onto a computer or other programmable apparatus (i.e., hardware) to produce a machine, such that the instructions which execute on the computer or other programmable apparatus create means for implementing the functions specified in the flowchart block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block (s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart block(s) or step(s).

Accordingly, blocks or steps of the flowchart support combinations of means for performing the specified functions, combinations of steps for performing the specified functions and program instruction means for performing the specified functions. It will also be understood that one or more blocks or steps of the flowchart, and combinations of blocks or steps in the flowchart, can be implemented by special purpose hardware-based computer systems which perform the specified functions or steps, or combinations of special purpose hardware and computer instructions.

As shown in FIG. 7, one embodiment of a method of extracting wave energy may include receiving information defining characteristics of wave action proximate to a watercraft that is configured to roll in response to the wave action and that has a pendulum configured to swing responsive to the wave action at operation 400. The method may further include tuning roll characteristics of the watercraft to the characteristics of the wave action at operation 410. In some embodiments, the method may include an additional optional operation of tuning the pendulum to characteristics of the wave action at operation 420. In some embodiments, the method may further include an optional additional operation (shown in dashed lines in FIG. 7) in which the kinetic energy from the watercraft and pendulum roll mismatch may be turned into electrical energy 430.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for extracting wave energy, the method comprising:

providing a watercraft configured to roll in response to wave action, the watercraft having variable wave response characteristics and having on-board
   a pendulum having selectively variable swing characteristics, the pendulum being disposed on the watercraft so that the pendulum can swing in response to watercraft motion resulting from the wave action, and
   a generator operatively coupled to the pendulum;
receiving from a remote source information on wave characteristics of incoming waves;
changing the wave response characteristics in response to the information on wave characteristics;
setting the pendulum swing characteristics to achieve a desired swing response; and
converting energy from the pendulum swing action to electrical energy using the generator.

2. A method according to claim 1 further comprising:
transmitting the electrical energy to a power grid.

3. A method according to claim 1 further comprising:
attaching a first end of an attachment line to the watercraft;
attaching a second end of the attachment line to an anchor; and
attaching the anchor to a sea floor.

4. A method according to claim 3 wherein the remote source includes a wave measurement device attached to the anchor.

5. A method according to claim 3 further comprising:
determining the information on wave characteristics using the wave measurement device; and
transmitting the information on wave characteristics to the watercraft.

6. A method according to claim 1 further comprising:
changing at least one of the set consisting of the wave response characteristics of the watercraft and the swing characteristics of the pendulum based on the information on wave characteristics of incoming waves.

7. A method according to claim 6 wherein the action of changing at least one of the set consisting of the wave response characteristics of the watercraft and the swing characteristics of the pendulum includes at least one of the set consisting of:
determining optimum wave response characteristics to achieve a desired result; and
determining optimum swing characteristics to achieve the desired result.

8. A method according to claim 7 wherein the desired result is one of the set consisting of maximized watercraft rolling action, reduced rolling action of the watercraft, maximized pendulum swing, and maximized electrical energy production.

9. A method according to claim 6 wherein the action of changing at least one of the set consisting of the wave response characteristics of the watercraft and the swing characteristics of the pendulum includes at least one of the set consisting of:
modifying a metacentric height of the watercraft; and
modifying a center of gravity of the watercraft.

10. A method according to claim 6 wherein the action of changing at least one of the set consisting of the wave response characteristics of the watercraft and the swing characteristics of the pendulum includes at least one of the set consisting of:
modifying a length of the pendulum; and
modifying a weight of the pendulum.

11. A method for extracting wave energy, the method comprising:
providing a watercraft configured to roll in response to wave action, the watercraft having variable wave response characteristics and having on-board
   a pendulum having selectively variable swing characteristics, the pendulum being disposed on the watercraft so that the pendulum can swing in response to watercraft motion resulting from the wave action, and
   a generator operatively coupled to the pendulum;
receiving from a remote source information on wave characteristics of incoming waves;
optimizing the watercraft response characteristics and the pendulum swing characteristics to achieve a desired level of kinetic energy due to pendulum swing action in response to the wave action; and
converting energy from the pendulum swing action to electrical energy using the generator.

12. A method according to claim 11 further comprising:
transmitting the electrical energy to a power grid.

13. A method according to claim 11 wherein the remote source includes a wave measurement device configured for determining and transmitting the information on wave characteristics of incoming waves.

14. A method according to claim 13 wherein
the watercraft is attached to an anchor by an attachment line,
the anchor is attached to the sea floor, and
the wave measurement device is attached to the anchor.

15. A method according to claim 11 wherein the action of optimizing the watercraft response characteristics and the pendulum swing characteristics includes:
determining optimum wave response characteristics; and
determining optimum swing characteristics.

16. A method according to claim 15 wherein the action of optimizing the watercraft response characteristics and the pendulum swing characteristics further includes:
changing at least one of the set consisting of the wave response characteristics of the watercraft and the swing characteristics of the pendulum.

17. A method according to claim 16 wherein the action of changing at least one of the set consisting of the wave response characteristics of the watercraft and the swing characteristics of the pendulum includes at least one of the set consisting of:
modifying a metacentric height of the watercraft; and
modifying a center of gravity of the watercraft.

18. A method according to claim 16 wherein the action of changing at least one of the set consisting of the wave response characteristics of the watercraft and the swing characteristics of the pendulum includes at least one of the set consisting of:
modifying a length of the pendulum; and
modifying a weight of the pendulum.

19. A system for extracting wave energy, the system comprising:
a watercraft configured to roll in response to wave action, the watercraft having variable wave response characteristics;
a platform response tuning system configured for selectively changing the wave response characteristics of the watercraft;
a pendulum having selectively variable swing characteristics, the pendulum being disposed on the watercraft so that the pendulum can swing in response to watercraft motion resulting from the wave action;
a pendulum tuner configured for selectively changing the swing characteristics of the pendulum;

a wave measurement device configured for measuring wave action characteristics and being positionable remote from the watercraft; and a controller in communication with the wave measurement device, the platform response tuning system and the pendulum tuner, the controller being configured for receiving wave characteristics information from the wave measurement device, determining desirable changes to at least one of the set consisting of the wave response characteristics of the watercraft and the swing characteristics of the pendulum based at least in part on the wave characteristics information, and causing the pendulum tuner to change at least one of the set consisting of the wave response characteristics of the watercraft and the swing characteristics of the pendulum.

20. A system according to claim 19 further comprising:

an anchor attachable to a sea bed at an anchoring point; and an attachment line having a first end attached to the watercraft and a second end attached to the anchor, the attachment line having a length greater than a depth of water at the anchoring point, wherein the wave measurement device is attached to the anchor.

* * * * *